United States Patent
Zhao et al.

(10) Patent No.: US 11,140,561 B2
(45) Date of Patent: Oct. 5, 2021

(54) ELECTRONIC DEVICE AND METHOD FOR WIRELESS COMMUNICATION

(71) Applicant: Sony Corporation, Tokyo (JP)

(72) Inventors: Youping Zhao, Beijing (CN); Jingyun Wang, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 38 days.

(21) Appl. No.: 16/634,887

(22) PCT Filed: Oct. 19, 2018

(86) PCT No.: PCT/CN2018/110964
§ 371 (c)(1),
(2) Date: Jan. 29, 2020

(87) PCT Pub. No.: WO2019/080771
PCT Pub. Date: May 2, 2019

(65) Prior Publication Data
US 2020/0236560 A1   Jul. 23, 2020

(30) Foreign Application Priority Data
Oct. 25, 2017  (CN) .......................... 201711009075.6

(51) Int. Cl.
*H04W 16/10* (2009.01)
*H04W 16/18* (2009.01)
(Continued)

(52) U.S. Cl.
CPC ............. *H04W 16/18* (2013.01); *H04L 45/02* (2013.01); *H04W 16/10* (2013.01); *H04W 24/02* (2013.01);
(Continued)

(58) Field of Classification Search
None
See application file for complete search history.

(56) References Cited

U.S. PATENT DOCUMENTS

| 2013/0148515 | A1* | 6/2013 | Ribeiro | H04L 5/0048 370/252 |
| 2013/0196699 | A1* | 8/2013 | Davydov | H04W 52/0216 455/500 |

(Continued)

FOREIGN PATENT DOCUMENTS

| CN | 105451250 A | 3/2016 |
| CN | 106788646 | 5/2017 |

(Continued)

OTHER PUBLICATIONS

International Search Report and Written Opinion dated Jan. 17, 2019 for PCT/CN2018/110964 filed on Oct. 19, 2018, 9 pages including English Translation of the International Search Report.

(Continued)

*Primary Examiner* — Jenkey Van
(74) *Attorney, Agent, or Firm* — Xsensus LLP

(57) ABSTRACT

The present disclosure provides an electronic device and method for wireless communication. The electronic device comprises: a processing circuit configured to determine a collaborative access point set for users within a predetermined range by using a wireless network topology of a wireless network as a state, and to redetermine the collaborative access point set for the users in response to a change in the wireless network topology, wherein the wireless network topology comprises a user distribution and an access point distribution.

17 Claims, 11 Drawing Sheets

(51) Int. Cl.
  *H04L 12/751* (2013.01)
  *H04W 24/02* (2009.01)
  *H04W 48/20* (2009.01)
  *H04W 72/04* (2009.01)
  *H04W 72/08* (2009.01)
  *H04W 88/08* (2009.01)
(52) U.S. Cl.
  CPC ....... *H04W 48/20* (2013.01); *H04W 72/0453* (2013.01); *H04W 72/082* (2013.01); *H04W 72/085* (2013.01); *H04W 88/08* (2013.01)

(56) References Cited

U.S. PATENT DOCUMENTS

| | | | |
|---|---|---|---|
| 2014/0235266 A1 | 8/2014 | Edge et al. | |
| 2014/0328307 A1* | 11/2014 | Takano | H04W 48/18 370/329 |
| 2017/0238246 A1* | 8/2017 | Lin | H04W 48/20 370/328 |
| 2018/0152951 A1* | 5/2018 | Zhuang | H04W 24/02 |
| 2018/0270673 A1* | 9/2018 | Chen | H04W 36/38 |
| 2019/0019082 A1* | 1/2019 | Dasgupta | G06N 3/0445 |
| 2020/0029257 A1* | 1/2020 | Li | H04B 7/024 |

FOREIGN PATENT DOCUMENTS

| | | |
|---|---|---|
| WO | 2016/208955 A1 | 12/2016 |
| WO | 2017/036320 A1 | 3/2017 |

OTHER PUBLICATIONS

Garcia Virgile et al: "Coordi nated Multipoint Transmission in Dense Cellular Networks With User-Centric Adaptive Clustering", IEEE Transactions on Wireless Communications, vol. 13, No. 8, Aug. 1, 2014 (Aug. 1, 2014), pp. 4297-4308, XP011555885,ISSN: p. 4297, col. 1, paragraph 4300, col. 1, paragraph 2 ** IV.B;p. 4301, col. 2, paragraph 4302, col. 1.

* cited by examiner

ELECTRONIC DEVICE AND METHOD FOR WIRELESS COMMUNICATION

CROSS-REFERENCE TO RELATED APPLICATIONS

The present application is based on PCT filing PCT/CN2018/110964, filed Oct. 19, 2018, which claims priority to Chinese Patent Application No. 201711009075.6, filed Oct. 25, 2017 with the China National Intellectual Property Administration, each of which is incorporated herein by reference in its entirety.

FIELD

The present disclosure generally relates to the field of wireless communications, and in particular to resource management in a User Centric Network (UCN), and more particularly to an electronic apparatus and a method for wireless communications.

BACKGROUND

With the rapid development of communication networks, mobile data rate requirements of users are exponentially increased. In addition, the mobility, flexible configuration and the like of the apparatus also bring challenges to future wireless networks. An ultra-dense network (UDN) involving deployment of microminiaturized base stations becomes an effective technology for addressing the growing mobile data rate requirements. Since the small base stations are densely and flexibly configured, it becomes possible to implement the user centric network (UCN), so as to support effective communication of massive amounts of mobile users and devices. The UCN allows each user to select multiple access points such as base stations in a joint manner, to perform coordinated transmission, thereby meeting requirements for quality of service of all users at a largest probability. Therefore, a user-centric ultra-dense network (UUDN) will become the main tendency of future networks.

In addition, with the development of artificial intelligence and Internet of Things, artificial intelligence methods such as machine learning become one of the focuses of recent researches. The wireless network emulates the mode of human thinking, so that the resource management becomes more intelligent.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: determine a coordination access point group for a user within a predetermined range, by taking a wireless network topology structure of a wireless network as a state; and re-determine a coordination access point group for the user in response to a change of the wireless network topology structure, wherein the wireless network topology structure comprises a distribution of users and a distribution of access points.

According to another aspect of the present disclosure, a method for wireless communications is provided. The method includes: determining a coordination access point group for a user within a predetermined range, by taking a wireless network topology structure of a wireless network as a state; and re-determining a coordination access point group for the user in response to a change of the wireless network topology structure, wherein the wireless network topology structure comprises a distribution of users and a distribution of access points.

According to other aspect of the present disclosure, there are further provided computer program codes and computer program products for implementing the above methods, as well as a computer-readable storage medium having recorded thereon the computer program codes for implementing the methods described above.

With the electronic apparatus and the method according to the present disclosure, the coordination access point group (APG) can be dynamically selected, thereby meeting the communication requirements of all users in a better way.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
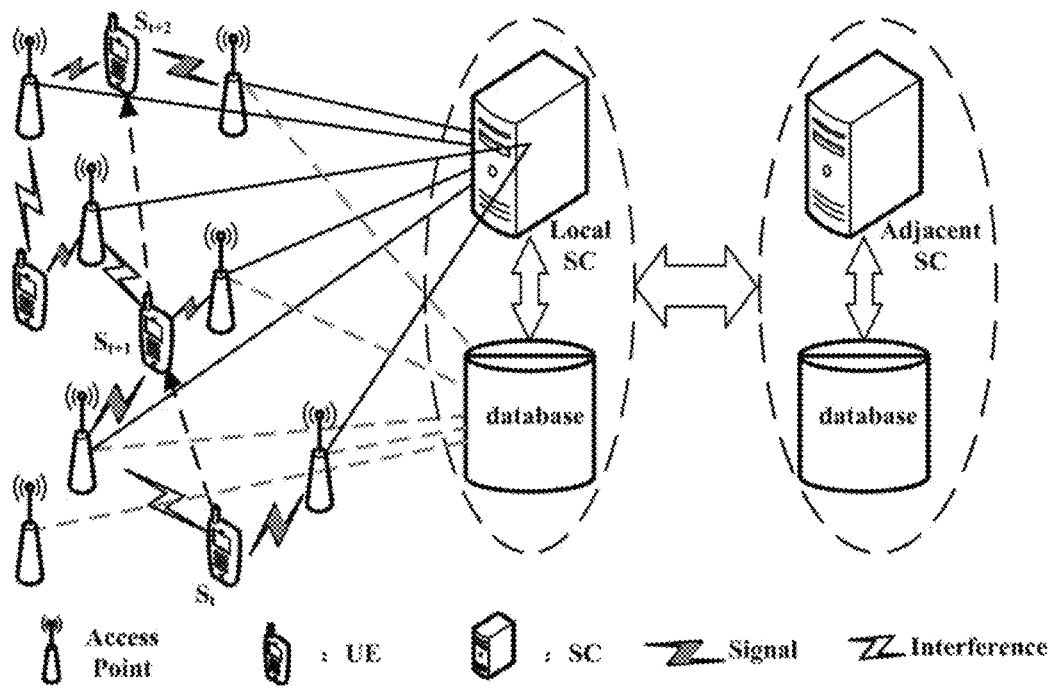
FIG. 1 is a schematic diagram showing a scenario of the UUDN.

FIG. 1 is a schematic diagram showing a scenario of the UUDN. There are multiple access points (AP) around user equipment (UE, which is also referred to as a user hereinafter). The UE performs coordination transmission by using different APs. Further, each of the APs is communicatively connected to a spectrum management device such as a spectrum coordinator (SC). The SC determines a coordination APG for the UE within a management range of the SC. The coordination APG is a group of APs having coordination relationships with the corresponding UE, that is, a group of Aps providing communication access services to the UE. Further, a local SC may properly communicate with an adjacent SC, so as to interchange information. It can be seen that, compared with a conventional cellular network architecture, the network architecture shown in FIG. 1 is characterized in the great number of APs, which is even greater than the number of the UE.

The AP described herein may be any node which provides network communication service, such as a base station, a small base station or the like. The base station may be implemented as any type of evolved node B (eNB), such as a macro eNB and a small eNB.

The small eNB may be an eNB such as a pico eNB, a micro eNB, and a home (femto) eNB that covers a cell smaller than a macro cell. Instead, the base station may be realized as any other types of base stations such as a NodeB and a base transceiver station (BTS). The base station may include a main body (that is also referred to as a base station apparatus) configured to control wireless communication, and one or more remote radio heads (RRH) disposed in a different place from the main body. In addition, various types of terminals may each operate as the base station by temporarily or semi-persistently executing a base station function.

The UE or the user may be any wireless communication device providing service or any terminal device. For example, the terminal device may be implemented as a mobile terminal (such as a smart phone, a tablet personal computer (PC), a notebook PC, a portable game terminal, a portable/dongle mobile router and a digital camera) or an in-vehicle terminal (such as a car navigation device). The terminal device may also be implemented as a terminal (that is also referred to as a machine type communication (MTC) terminal) that performs machine-to-machine (M2M) communication. In addition, the terminal device may be a wireless communication module (such as an integrated circuit module including a single die) installed on each of the above terminals.

In addition, the SC shown in FIG. 1 is just an example of the spectrum management device, other types of the spectrum management device such as a spectrum access system (SAS) may be adopted, which are not restrictive.

Figure 2:
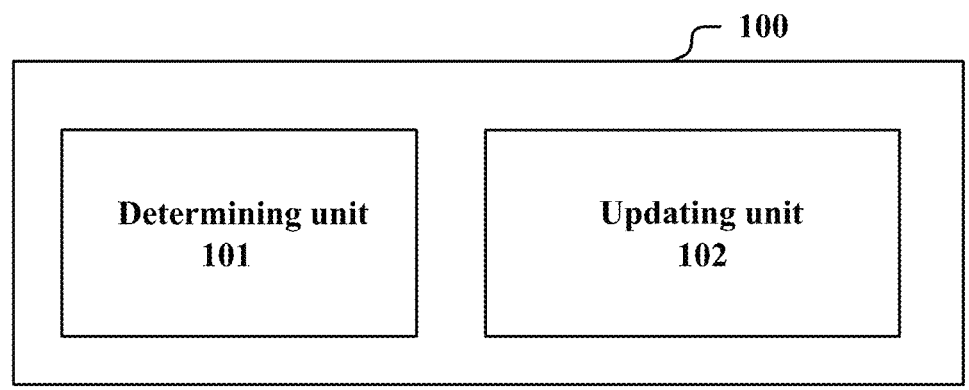
FIG. 2 is a block diagram showing function modules of an electronic apparatus for wireless communications according to an embodiment of the present disclosure.

In the scenario shown in FIG. 1, the user and even the access point both may be in a mobile state. Thus, a coordination APG being dynamically selected for the user is advantageous to maintain stable communication of high quality. In view of this, an electronic apparatus 100 for wireless communications is provided according to an embodiment of the present disclosure. As shown in FIG. 2, the electronic apparatus 100 includes a determining unit 101 and an updating unit 102. The determining unit 101 is configured to determine a coordination access point group (APG) for a user within a predetermined range, by taking a wireless network topology structure of a wireless network as a state. The updating unit 102 is configured to re-determine a coordination access point group for the user in response to a change of the wireless network topology structure.

The determining unit 101 and the updating unit 102 each may be implemented by one or more processing circuitries. The processing circuitry, for example, may be implemented as a chip. The electronic apparatus 100, for example, may be located on the spectrum management device (such as the SC or the SAS) shown in FIG. 1. Alternatively, the electronic apparatus 100 may be communicatively connected to the spectrum management device.

In this embodiment, the electronic apparatus 100 may determine the coordination APG for the user within the predetermined range by using a reinforcement learning algorithm. The predetermined range, for example, may be at least a part of a management range of the spectrum management device on which the electronic apparatus is located.

In the reinforcement learning algorithm, learning is regarded as a process of exploring evaluation, to learn a map from an environment state to an action, so that a selected action can obtain a maximum award from the environment, that is, so that an external environment evaluates a learning system in some sense as optimum (or operation performance of a whole system is optimum). The reinforcement learning algorithm used herein, for example, may include a Q-learning algorithm, a difference learning algorithm or the like. The wireless network topology structure may be taken as a state.

In an example, the wireless network topology structure includes a distribution of users and a distribution of access points. In other words, in a case that the users and/or the access points move, or on-off states of specific users and/or access points change, the wireless network topology structure changes. As shown in FIG. 1, in a case that the UE moves in a direction from bottom to top, as indicated by the black dashed line with arrow, the wireless network topology structure changes, for example, corresponding to states $S_t$, $S_{t+1}$, and $S_{t+2}$ shown in FIG. 1. In this case, the coordination APG determined for the user in a previous state may be not applicable in a new state, for example, may not meet communication requirements of the user. Therefore, the updating unit 102 re-determines a coordination APG for the user in response to a change of the wireless network topology structure, so as to provide stable and continuous communication service to the user.

In an example, the change of the wireless network topology structure includes a change of a position of the user. The change is detected by the user. When detecting the change, the user reports the change to the electronic apparatus 100 and requests the electronic apparatus 100 to re-determine a coordination APG for the user. In other examples, for example, the change of the wireless network topology structure further includes a change of a position of the access point. The access point also reports the change of the position of the access point to the electronic apparatus 100. Correspondingly, the electronic apparatus 100 may re-determine a coordination APG for the user based on the change.

For example, the determining unit 101 may take a coordination relationship between the user and the access point as an action in the reinforcement learning algorithm, and with respect to each action, calculate an evaluation of the action based on a degree of meeting communication quality requirement of the user and a resulting network overhead when performing the action. Generally, the user has specific requirements for communication quality of the user. When performing an action, the degree of meeting communication quality requirement of the user indicates one aspect of the evaluation of the action. The communication quality requirement of the user may be represented by, for example, quality of service (QoS) required by the user. As described in the following, the communication quality requirement of the user may be represented by a signal to interference and noise ratio (SINR) threshold. It should be noted that, this is only an example and is not restrictive.

In addition, when the previous state changes to a current state, the action changes correspondingly. For example, an action determined in the previous state changes to another action. The change of the action indicates the change of the coordination APG of the UE, resulting in switching between APs, which incurs the network overhead. In terms of the evaluation of the action, the network overhead is expected to be as small as possible. Therefore, the network overhead indicates another aspect of the evaluation of the action.

In an example, the determining unit 101 determines the coordination APG for the user in the current state based on an action with the highest evaluation. In other words, the determining unit 101 determines the action with the highest evaluation as an action to be performed, so as to determine coordination APGs for respective users. For example, the action with the highest evaluation is an action when being performed results in the highest degree of meeting the communication quality requirement of the user and the lowest network overhead, compared with other actions.

For convenience of understanding, aspects of the embodiment are described with the Q-learning algorithm as an example in the following. However, it should be noted that this is not restrictive, other reinforcement learning algorithms are also applicable in the present disclosure.

It is assumed that there are N users and M APs within the predetermined range, coordination relationships between the users and the access points, that is, actions (which are also referred to as individuals) in the reinforcement learning algorithm may be expressed by a following matrix in the equation (1):

$$A'_i = \begin{bmatrix} a_{11} & a_{12} & \cdots & a_{1M} \\ a_{21} & a_{22} & \cdots & a_{2M} \\ \vdots & \vdots & \ddots & \vdots \\ a_{N1} & a_{N2} & \cdots & a_{NM} \end{bmatrix}_{N \times M} \quad (1)$$

where $a_{n,m}$ (n=1, . . . , N; m=1, . . . , M) denotes a coordination relationship between an n-th user and an m-th AP. For example, in a case that $a_{n,m}$ is equal to 1, it is indicated that there is a coordination relationship between the n-th user and the m-th AP. In a case that $a_{n,m}$ is equal to 0, it is indicated that there is no coordination relationship between the n-th user and the m-th AP.

For convenience of operation, equation (1) may be transformed into a vector represented by equation (2).

$$A_i = [a_{11} a_{12} \cdots a_{1M} a_{21} a_{22} \cdots a_{2M} \cdots a_{N1} a_{N2} \cdots a_{NM}]_{1 \times NM} \quad (2)$$

That is, rows in the equation (1) are rearranged in one row. In a case of there being multiple actions, each of the multiple actions is taken as one row, to form an action matrix.

First, multiple actions, that is, multiple $A_i$s having different values, are initially generated for a state, such as the state $S_t$. For example, the generated actions may be defined by setting a predetermined condition. The predetermined condition may include, for example, one or more of: the generated action causes the communication quality for each user to meet the communication quality requirement of the user; and the network overhead produced when using this coordination relationship relative to an action determined in the previous state does not exceed a predetermined overhead threshold. For example, the communication quality requirement may be expressed by the SINR threshold.

As described in the above, a degree of meeting communication quality requirement of each user and a resulting network overhead when performing each action in the state are taken as the evaluation of the action. In the Q-learning algorithm, the evaluation of the action is expressed by a Q-value. Evaluations of actions form a Q-value matrix.

In an example, the determining unit 101 may calculate the degree of meeting communication quality requirement of each user using an SINR threshold for the user and an estimated SINR of the user. The estimated SINR of a user being closer to the SINR threshold for the user indicates a higher degree of meeting communication quality requirement of the user. For example, the determining unit 101 may take degrees of meeting communication quality requirement of the users into consideration comprehensively.

In an example, the degree of meeting communication quality requirement of the user includes a utility value of all users and a cost value of not meeting the SINR of the user. The utility value of the user is calculated from a utility function. The utility function is a non-linear function of a ratio of the estimated SINR of the user to the SINR threshold for the user. The cost value depends on a difference between the SINR threshold of a user and the estimated SINR of the user. The utility value is used to represent a degree of satisfaction of the estimated SINR of the user relative to the SINR threshold. The cost value is used to denote a degree of dissatisfaction of the estimated SINR of the user relative to the SINR threshold.

For example, when performing an action $A_i$ in the state $S_t$, the degree of meeting communication quality requirement of the user $R(S_t, A_i)$ may be calculated by using the following equation (3):

$$R(S_t, A_i) = \prod_n^N U_n - \sigma \sum_n^N [\max\{0, SINR_n^{th} - SINR_n\}]^2 \quad (3)$$

where $U_n$ denotes a utility value of an n-th user, which is calculated from a utility function of the user, for example, by using the following equation (4), where $\sigma$ denotes a cost factor, $SINR_n^{th}$ denotes a SINR threshold for the n-th user, and $SINR_n$ denotes an estimated SINR of the n-th user.

$$U_n = f_n(SINR_n, SINR_n^{th}) = \frac{1}{2} \times \left\{\tanh\left\{\xi \times \left(\frac{SINR_n}{SINR_n^{th}} - \eta\right)\right\} + 1\right\} \quad (4)$$

Figure 3:
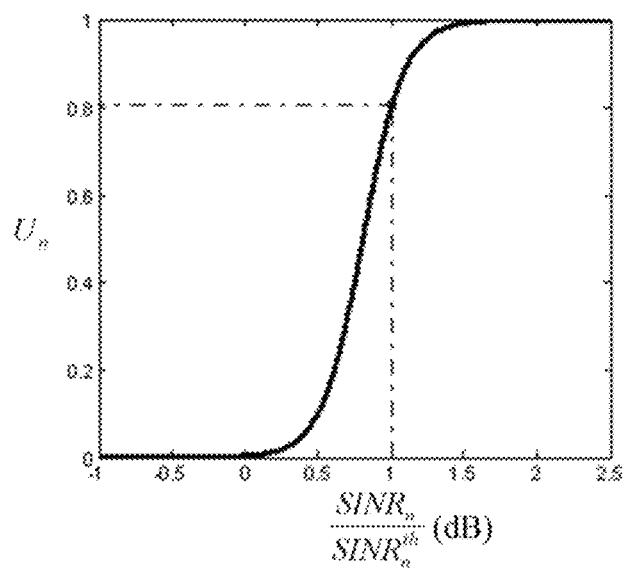
FIG. 3 is a graph of an example of a utility function.

In the above equation, tanh ( ) denotes a hyperbolic tangent function, $\xi$ denotes an extension factor (for example, which may be equal to 3.5834), and $\eta$ denotes a symmetric center (for example, which may be equal to 0.8064). FIG. 3 shows a curve of an example of the utility function. As shown in FIG. 3, in a case that the SINR of the user is greater than the SINR threshold for the user, the curve of the utility function is changes relatively slowly and approximates 1, so as to avoid an overlarge R value due to an over-high SINR of a user. It should be understood that the utility function is not limited to the form expressed by the equation (4), but may be modified properly.

In the above calculation, $SINR_n^{th}$, for example, may be provided by the user. $SINR_n$ may be estimated by various communication system models. In an example, $SINR_n$ may be calculated by using the following equation:

$$SINR_n = \frac{\sum_{j \in \Phi_{C(n)}} p_j(d_{nj})^{-\alpha}}{\sum_{k \in \Phi_{I(n)}} p_k(d_{nk})^{-\alpha} + n_0} \quad (5)$$

where $p_j$ and $p_k$ denote power of a j-th AP and power of a k-th AP respectively, $d_{nj}$ denotes a distance between the n-th user and the j-th AP, $d_{nk}$ denote a distance between the n-th user and the k-th AP, $\alpha$ denotes a path loss factor, $\Phi_{c(n)}$ denotes a coordination APG for the n-th user, $\Phi_{I(n)}$ denotes an interference APG for the n-th user, $n_0$ denotes a noise power at a receiver of the user, and the interference APG indicates a group of APs interfering with the focused n-th user when providing communication access services to other users.

As shown in the above equation (3) to equation (5), the determining unit 101 calculates the degree of meeting communication quality requirement of the user. In the Q-learning algorithm, the degree of meeting communication quality requirement of the user is equivalent to a bonus. Position information of the user, position information and emitting power of the access point, and the communication quality requirement of the user such as the SINR threshold, are used in the above calculation.

In addition, the determining unit 101 may be further configured to use, with respect to each action, a difference between this action and an action determined in a previous state as the network overhead produced by this action. For example, in a case that the determining unit 101 determines the action with the highest evaluation as the action to be performed, the action determined in the previous state is an action with the highest evaluation in the previous state. In a case that the current state is an initial state, that is, there is no previous state, the network overhead may be set to be zero.

In an example, the determining unit 101 may use operation amount for performing network switching operation when performing an action, as compared with the action determined in the previous state, as a network overhead produced by the action.

As described in the above, the action may be represented by a binarization matrix of the coordination relationship. In this case, the network overhead may be represented by a Hamming distance between actions, as expressed by the following equation (6). In practice, in a case that an action is represented by 0 or 1, the Hamming distance between actions physically means the number of the switched coordination APs between two APG options. In the Q-learning algorithm, the network overhead is equivalent to the cost value.

$$PH(S_t, A_i) = -\sigma \sum_n^N [D_{ham}(A_i, A_{S_{t-1}})]^2 \quad (6)$$

where $A_{S_{t-1}}$ denotes an action determined to be performed in the previous state $S_{t-1}$, denotes a cost factor, and $D_{ham}( )$ denotes a calculation of the Hamming distance. As described in the above, in a case that the state $S_t$ is the initial state, $PH(S_t, A_t)$ may be set to be zero.

In another example, the network overhead produced when performing the action is taken into consideration only when the network overhead exceeds a predetermined overhead threshold. In this case, the network overhead may be calculated from the following equation (7):

$$PH(S_t, A_i) = -\sigma \sum_n^N [\max\{0, D_{ham}(A_i, A_{S_{t-1}}) - T_d\}]^2 \quad (7)$$

where $T_d$ denotes a predetermined network overhead threshold, that is, a predetermined Hamming distance threshold. As shown in the equation (7), the network overhead is calculated only when the Hamming distance between an action $A_t$ and an action $A_{S_{t-1}}$, is greater than the predetermined network overhead threshold $T_d$. Otherwise, the network overhead is set to be zero. The predetermined network overhead threshold is used in this calculation. The predetermined network overhead threshold may be provided by the AP.

By combining the above equations (3) and (7), the evaluation of the action may be calculated as follows, so as to obtain a Q-value matrix $Q(S_t)$ in the state $S_t$. Elements of the Q-value matrix $Q(S_t)$ are calculated as follows:

$$Q(S_t,A_i)=R(S_t,A_i)+PH(S_t,A_i) \qquad (8)$$

where the Q-value matrix $Q(S_t)$ is a matrix with a dimension of T×1, and T denotes the number of actions. Based on the obtained Q-value matrix $Q(S_t)$, for example, an action corresponding to the largest Q-value, that is, an action with the highest evaluation may be determined as a selected result of the APG in the state $S_t$. In this case, the communication quality requirement of each user is met as much as possible, and the network overhead produced by switching the AP is reduced.

It should be understood that the above calculation for selecting the APG may be performed online, offline, or in a manner of combination of the online and the offline.

Figure 4:
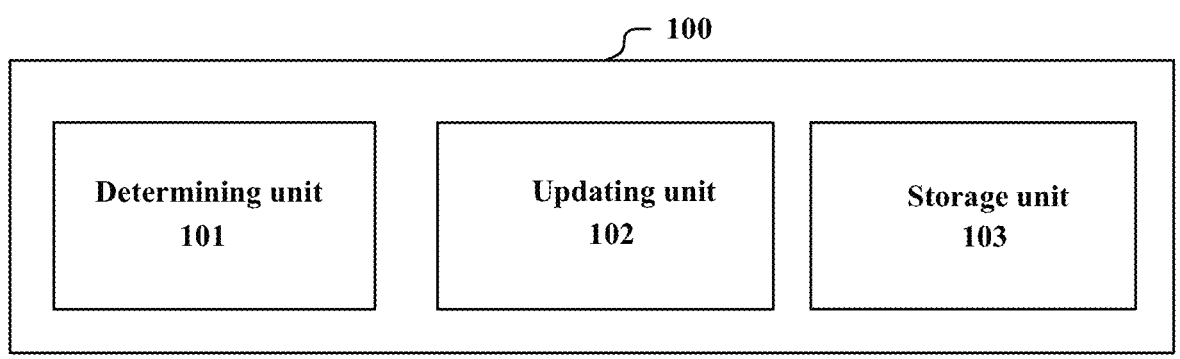
FIG. 4 is a block diagram showing function modules of an electronic apparatus for wireless communications according to an embodiment of the present disclosure.

As shown in FIG. 4, the electronic apparatus 100 may further include a storage unit 103. The storage unit 103 is configured to store, with respect to each state, each action in the state in association with an evaluation calculated with respect to the action as an evaluation matrix.

The storage unit 103 may be implemented by various storages. The evaluation, for example, may include two aspects of the above described degree of meeting communication quality requirement of the user (for example, $R(S_t, A_i)$) and the network overhead produced by performing the action (for example, $PH(S_t, A_i)$).

It should be understood that after the evaluation matrix is created, the updating unit 102 may be configured to determine, when the state changes and in a case that there is an evaluation matrix for the changed state, an action to be performed in the changed state based on content of the evaluation matrix. Specifically, an action suitable for the current state, for example, the action with the highest evaluation, may be selected based on the current state. After the action is selected, the coordination relationship between the UE and the AP is determined correspondingly. In this way, calculation load can be reduced, processing speed can be increased, and the APG can be switched quickly and stably while the user is in the mobile state.

In another aspect, in a case of no evaluation matrix for the changed state, an evaluation matrix is created for the changed state as described in the above.

In addition, the updating unit 102 may be further configured to update, when the state changes, an evaluation of the action performed in the previous state which is stored in the storage unit 103 using information of actual communication quality of the user when performing the determined action in the previous state. The actual communication quality of the user is acquired by measuring by the user.

For example, the updating unit 102 may replace the stored degree of meeting communication quality requirement that is obtained by estimation with the degree of meeting communication quality requirement that is calculated based on the actual communication quality of the user. In a case that the state changes from the state $S_t$ to the state $S_{t+1}$ and the action $A_t$ is determined in the state $S_t$, the updating unit 102, for example, may replace the stored $R(S_t, A_i)$ with the following equation (9):

$$R_{t+1} = \prod_n^N U_n - \sigma\sum_n^N [\max\{0, SINR_n^{th} - SINR_n^{actual}\}]^2 \qquad (9)$$

where $SINR_n^{actual}$ denotes an actual SINR of an n-th user, which is also used when calculating $U_n$ in equation (9). For example, $SINR_n^{actual}$ is a numerator in the tanh function when calculating $U_n$ by using equation (4).

The evaluation matrix is updated based on the information of the actual communication quality. In a case that actual communication quality corresponding to an action determined in a state is poor, the previously selected action would not be selected when returning to this state afterwards, thereby improving the communication quality.

In another example, correlation between the changed state, that is, the current state, and the previous state may also be taken into consideration when updating the evaluation matrix. For example, the updating unit 102 is configured to replace a portion of the evaluation of the action performed in the previous state which is related to the degree of meeting the communication quality requirement of the user with a following calculated value: a weighted sum of the actual degree of meeting the communication quality requirement of the user in the previous state and the estimated highest degree of meeting the communication quality requirement of the user in the current state.

For example, in the case that the state changes from the state $S_t$ to the state $S_{t+1}$ and the action $A_t$ is determined in the state $S_t$, the updating unit 102 may replace the stored $R(S_t, A_t)$ with the following equation (10):

$$R(S_t, A_i) \leftarrow R_{t+1}+\gamma \max_A R(S_{t+1}, A) \qquad (10)$$

where $R_{t+1}$ is the same as that in the equation (9).

$$\max_A R(S_{t+1}, A)$$

denotes that an action A is to be found in the state $S_{t+1}$, so that $R(S_{t+1}, A)$ is the maximum among R values of all actions. $\gamma$ is a discount factor and denotes a degree of correlation between the previous state and the current state. In a case of $\gamma=0$, it is indicated that the R value is only correlated with an R value in the previous state.

In addition, more generally, the wireless network topology structure being taken as the state may further include other variable parameters, such as one or more of: communication quality requirement of the UE, maximum emitting power of the AP, a predetermined network overhead threshold of the AP, and the like. That is, changes of the parameters may also cause the updating unit 102 to re-determine the APG, or update the stored evaluation of the action performed in the previous state.

In summary, the electronic apparatus 100 in this embodiment can determine coordination APGs for different states by using the reinforcement learning algorithm, to dynamically select the APG, thereby meeting communication quality requirements of all users in a better way. Further, although the reinforcement learning algorithm is taken as an example in the above description, the present disclosure is not limited thereto, other algorithms may also be used to determine the coordination APG.

Second Embodiment

Figure 5:
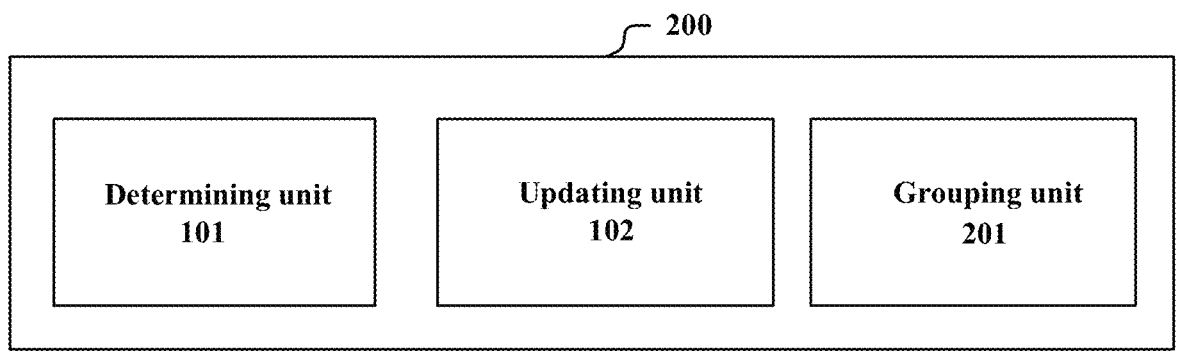
FIG. 5 is a block diagram showing function modules of an electronic apparatus for wireless communications according to another embodiment of the present disclosure.

FIG. 5 is a block diagram showing function modules of an electronic apparatus 200 for wireless communications according to another embodiment of the present disclosure. Besides the units shown in FIG. 2, the electronic apparatus 200 may further include a grouping unit 201. The grouping unit 201 is configured to: in each state, acquire an action by grouping the access points taking a user as a center and selecting the coordination APG for the user within a group of the user.

Similarly, the grouping unit 201 may be implemented by one or more processing circuitries. The processing circuitry, for example, may be implemented as a chip. In addition, although not shown in FIG. 5, the electronic apparatus 200 may further include the storage unit 103 described with reference to FIG. 4.

For example, the grouping unit 201 may perform the grouping based on a Euclidean distance between the user and the access point. A subordination parameter value of the access point to the user is calculated by using the following equation (11):

$$m_{ij} = \frac{1}{\|x_i - u_j\|}, \|x_i - u_j\| = \text{Euclidean distance} \quad (11)$$

where $u_j$ denotes a j-th UE, and $x_i$ denotes an i-th AP. A position of the AP and a position of the UE in a wireless network vary in different states, and the subordination parameter value also varies in different states. A short Euclidean distance from the AP to the UE corresponds to a large subordination parameter value. If a subordination parameter value of the AP to a certain UE is large, the AP is assigned to the UE. In this way, a group for each UE is established.

The determining unit 101 randomly selects the coordination access point group for the user within the group of the user, and takes the coordination relationship between the user and the access point which meets a predetermined condition as the action. The predetermined condition, similar to that in the first embodiment, may include one or more of: the communication quality for each user meets the communication quality requirement of the user; and the network overhead produced when using this coordination relationship relative to an action determined in the previous state does not exceed a predetermined overhead threshold.

A difference between this embodiment and the first embodiment lies in that, the action in this embodiment is generated in a different manner. For example, in a case that the action is represented by the binarization matrix, in this embodiment, an element corresponding to an AP outside of the group for the UE is set to be a value denoting no coordination relationship (for example, zero).

Therefore, with the electronic apparatus 200 including the grouping unit 201 in this embodiment, a selectable range of the coordination APs for the user can be reduced, so as to easily determine a reasonable action, thereby improving selection accuracy and reducing calculation load.

Third Embodiment

Figure 6:
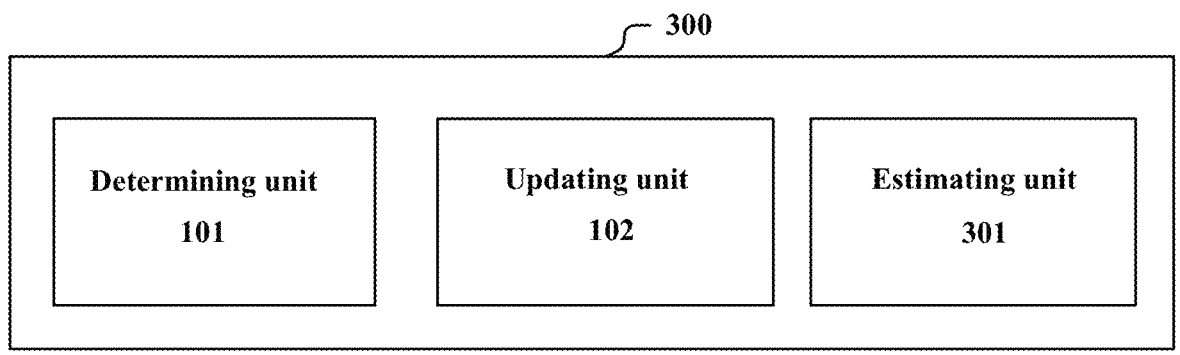
FIG. 6 is a block diagram showing function modules of an electronic apparatus for wireless communications according to another embodiment of the present disclosure.

FIG. 6 is a block diagram showing function modules of an electronic apparatus 300 for wireless communications according to another embodiment of the present disclosure. Besides the units shown in FIG. 2, the electronic apparatus 300 further includes an estimating unit 301. The estimating unit 301 is configured to estimate, with respect to each state, a new action based on a preliminarily acquired action.

Similarly, the estimating unit 301 may be implemented by one or more processing circuitries. The processing circuitry, for example, may be implemented as a chip. In addition, although not shown in FIG. 6, the electronic apparatus 300 may further includes the storage unit 103 described with reference to FIG. 4, the grouping unit 201 described with reference to FIG. 5 and the like.

In the first embodiment and the second embodiment, the action is preliminarily generated by randomly selecting the AP for the user. In this embodiment, in order to improve efficiency, the new action may be estimated further based on the preliminarily acquired actions.

For example, the estimating unit 301 may estimate the new action by using a genetic algorithm (GA).

Specifically, the estimating unit 301 may select $N_p$ actions having better R values from among the preliminarily acquired actions to form original populations of the genetic algorithm. A network fitness matrix of the original populations is calculated. The network fitness matrix of the populations is acquired based on a Q-value of each action, as expressed by the following equation (12):

$$f_{P_i} = f_i = \begin{cases} Q(S_t, P_i) & Q(S_t, P_i) > 0 \\ \Delta \to 0 & \text{Others} \end{cases} \quad (12)$$

where $P_i$ denotes an i-th individual in the populations, that is, an i-th action, $\Delta$ denotes a value approximating zero, and $Q(S_t, P_i)$ denotes a Q-value corresponding to $P_i$ in the state $S_t$.

Next, a selection operation is performed. For example, by using a roulette selection method, a probability that each individual appears among children is calculated based on a network fitness value of the individual in the original populations, and $N_p$ individuals are randomly selected based on the probability to form a children populations. The probability $p_i$ is calculated by using the following equation (13):

$$p_i = \frac{f_i}{\sum_{j=1}^{N_p} f_j}. \quad (13)$$

Next, a crossover operation is performed. Two individuals $A_m$ and $A_n$ are selected randomly from among the formed children populations. The crossover operation is performed on multiple points that are selected randomly, to form a new individual or populations. For example, the crossover operation performed on an i-th bit of an m-th individual $A_m$ and an i-th bit of an n-th individual $A_n$ are expressed as the following equation (14):

$$\begin{array}{l} \overset{i}{0\,0\,1\,0\,0\,1\,0\,1\,0\,0} \to \overset{i}{0\,0\,0\,0\,0\,1\,0\,1\,0\,0}\ A_m \\ 1\,0\,0\,1\,0\,1\,0\,1\,0\,0 \to 1\,0\,1\,1\,0\,1\,0\,1\,0\,0\ A_n. \end{array} \quad (14)$$

It should be noted that, the individuals shown in the equation (14) are exemplary, and the present disclosure is not limited thereto.

Next, a mutation operation is performed. An individual in the populations obtained by the crossover operation is selected randomly. The mutation operation is performed on a point randomly selected in the individual, to generate a more excellent individual. Since a chromosome of the individual is represented by 0 or 1, the mutation operation is performed to change a chromosome represented by 0 into a chromosome represented by 1, or to change a chromosome represented by 1 into a chromosome represented by 0. In this way, a new individual, that is, a new action is obtained.

The estimating unit 301 may repeat the selection operation, the crossover operation and the mutation operation, so as to generate multiple new actions. For example, the number of times for repeating the operations may be set in advance.

In an example, the estimating unit 301 is further configured to take an action estimated by using the genetic algorithm as a new action only if the action satisfies a predetermined condition. Similarly, the predetermined condition may include one or more of: the communication quality for each user meets the communication quality requirement of the user; and the network overhead produced when using this action relative to an action determined in the previous state does not exceed a predetermined overhead threshold.

The new action obtained in the above is added to preliminarily acquired actions, to form a new action group. The determining unit 101 determines an evaluation (for example, the Q-value in the first embodiment) of an action by using the reinforcement learning algorithm, to select an action with the highest evaluation as an action to be performed in the current state, so as to determine the coordination APG for each user.

The electronic apparatus 300 in this embodiment obtains a new action by using an estimation method such as the genetic algorithm, so as to expand the action group, such that an optimal coordination APG can be determined more accurately.

Fourth Embodiment

Figure 7:
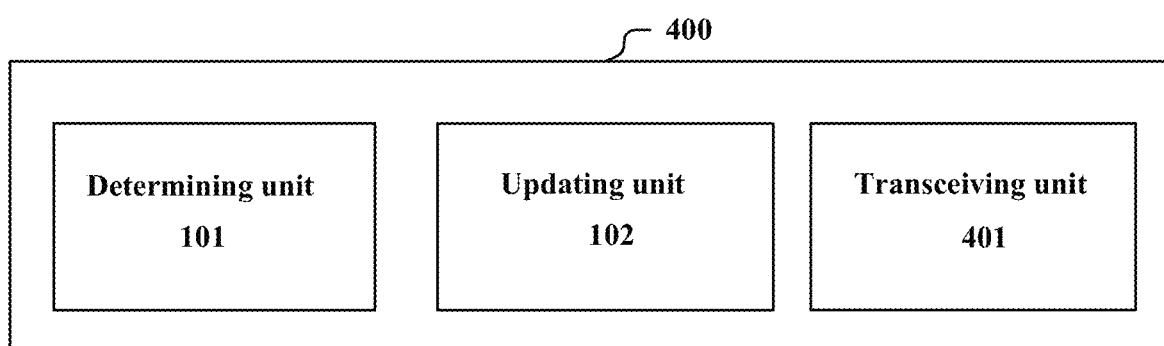
FIG. 7 is a block diagram showing function modules of an electronic apparatus for wireless communications according to another embodiment of the present disclosure.

FIG. 7 is a block diagram showing function modules of an electronic apparatus 400 for wireless communications according to another embodiment of the present disclosure. Besides the units shown in FIG. 2, the electronic apparatus 400 may further include a transceiving unit 401. The transceiving unit 401 is configured to receive one or more of position information and communication quality requirement of the user and one or more of position information, information of maximum emitting power and a predetermined network overhead threshold of the access point, and transmit information of the determined coordination access point group to the access point.

The transceiving unit 401, for example, may be implemented by a communication interface. The communication interface, for example, may include a network interface, or an antenna and a transceiving circuitry, and the like. In addition, although not shown in FIG. 7, the electronic apparatus 400 may further includes the storage unit 103 described with reference to FIG. 4, the grouping unit 201 described with reference to FIG. 5, and the estimating unit 301 described with reference to FIG. 6.

The above information received by the transceiving unit 401 is used to determine and update the coordination APG for the user. For example, in a case that the wireless network topology structure being taken as the state changes, the transceiving unit 401 re-acquires the above information.

In addition, the transceiving unit 401 is further configured to receive information of the actual communication quality of the user. For example, in a case that the state changes, the user reports actual communication quality, for example, an actual SINR and an actual utility value, obtained by performing the determined action in a state before changing, to the electronic apparatus 400.

The position information and communication quality requirement of the user may be provided to the transceiving unit 401 directly or via the access point.

Figure 8:
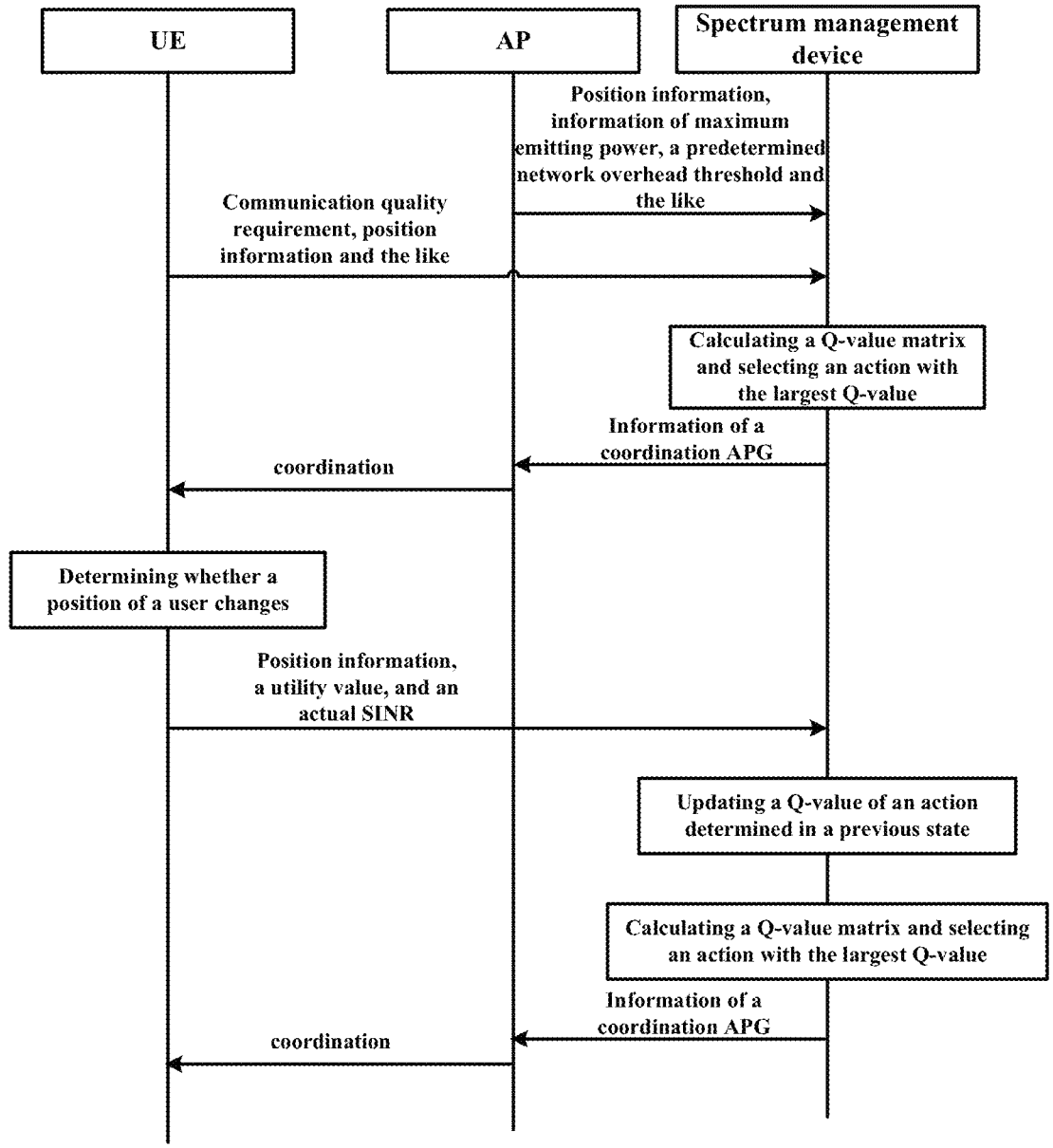
FIG. 8 is a schematic diagram showing an information procedure between a user, an access point and a spectrum management device.

For convenience of understanding, FIG. 8 shows a schematic diagram of an information procedure between a user (UE), an access point (AP) and a spectrum management device (for example, the SC or the SAS) in a case that the electronic apparatus 400 is arranged on the spectrum management device.

First, the UE requests an AP for coordination communication from the spectrum management device, and reports position information and information of the communication quality requirement such as the SINR threshold for the user to the spectrum management device. The AP reports the position information, the information of the maximum emitting power and the predetermined network overhead threshold of the AP to the spectrum management device. In a case that a position of the AP is fixed, the AP may report the position information of the AP only in a process of system initialization. As described in the above, the UE may directly report related information to the spectrum management device. Alternatively, the UE may report the related information to the spectrum management device via the AP. In the latter case, the information reported by the AP further includes the position information and the information of the communication quality requirement of the user.

After acquiring the above mentioned various pieces of information, the spectrum management device selects the coordination APG for the user. The spectrum management device may select an action having the largest Q-value by using the Q-learning reinforcement learning algorithm as described in detail in the first embodiment, so as to determine the coordination APG for each user. It should be noted that, in a case that evaluation matrixes for multiple states are stored in the spectrum management device, and if the current state is included in the stored states, the action may be selected based on the store evaluation matrixes without repeating the reinforcement learning algorithm.

Next, the spectrum management device transmits information of the determined coordination APG to the AP, so that the AP can coordinate with the UE based on the information.

In the example shown in FIG. 8, if only the position of the UE can change, the UE, for example, periodically determines whether the position of the UE changes. In a case that the position of the UE changes or the change reaches a certain degree, which indicates that the wireless network topology structure changes, the UE is required to request a new coordination APG. In this case, the UE reports the changed position information of the UE to the spectrum management device. The UE further reports an actual utility value and an actual SINR of the UE that are obtained by performing the determined action in a state before changing, to the spectrum management device. The spectrum management device updates, based on the actual utility value and the actual SINR that are provided by the UE, a Q-value of the action determined in the previous state. In addition, the spectrum management device further reselects, based on current position information of the UE, an action to be performed in the current state. For example, as described in the above, the spectrum management device may perform the selection by performing the Q-learning reinforcement learning algorithm. Alternatively, in a case that an evaluation matrix for the current state is stored in the spectrum management device, the action to be performed may be selected by searching for the evaluation matrix. Similarly, the spectrum management device transmits information of the determined coordination APG to the AP, so that the AP can coordinate with the UE based on the information.

It should be understood that, the information procedure shown in FIG. 8 is only exemplary rather than restrictive.

Figure 9:
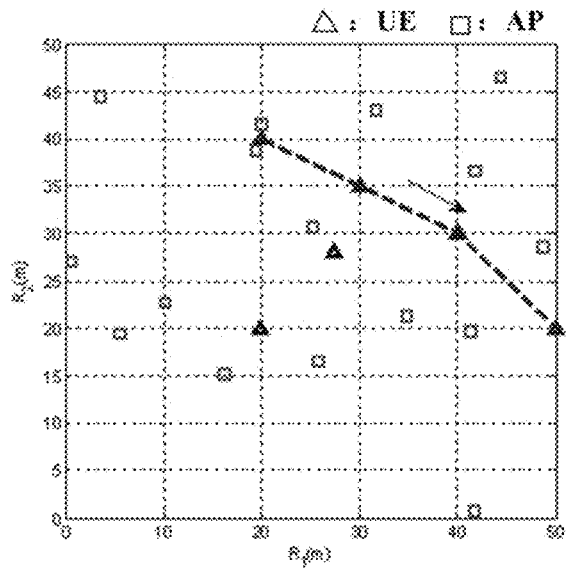
FIG. 9 is a schematic diagram showing a simulation scenario of a simulation instance.

In order to further illustrate details and effects of the technical solutions of the present disclosure, two simulation instances applying the technical solutions of the present disclosure are described in the following. First, the first simulation instance is described with reference to FIGS. 9 to 13. FIG. 9 is a schematic diagram showing a simulation scenario of the first simulation instance, where a triangle denotes UE, a square denotes an AP, and a dashed line with an arrow indicates a movement trace of one UE. FIG. 9 shows four different positions of the UE, which denote states $S_1$, $S_2$, $S_3$ and $S_4$ respectively.

Parameters used in simulation are listed as follows: an operation frequency of 3.5 GHz, a channel bandwidth of 10 MHz, 3 UEs, emitting power of 0 dBm, 16 APs, an SINR threshold for the UE of 7 dB, a noise figure of 5 dB at a receiver of the UE, 10 generations of population evolution in the genetic algorithm, a crossover ratio of 0.7, a mutation ratio of 0.1, 10 individuals, and a Hamming distance threshold of 5.

In the state $S_1$, the UE uploads the position information and the information of communication quality requirement to the spectrum management device. The AP uploads the position information, the information of the maximum emitting power, and the Hamming distance threshold to the spectrum management device. The spectrum management device generates some preliminary actions, and generates, based on the preliminary actions, new actions by using the genetic algorithm. The preliminary actions and the new actions form an action matrix $\overline{A_1}$. An example of the action matrix $\overline{A_1}$ in the state $S_1$ is shown on the left side in FIG. 10, where each row denotes one action, that is, one coordination relationship between the AP and the UE, and 18 actions are shown. Each action is represented by a binary sequence including 48 bits. There are M (M=16 in this embodiment) APs. Bits 1 to M denote a coordination relationship between a user 1 and the APs, and Bits M+1 to 2M denote a coordination relationship between a user 2 and the APs, and so on.

Figure 10:
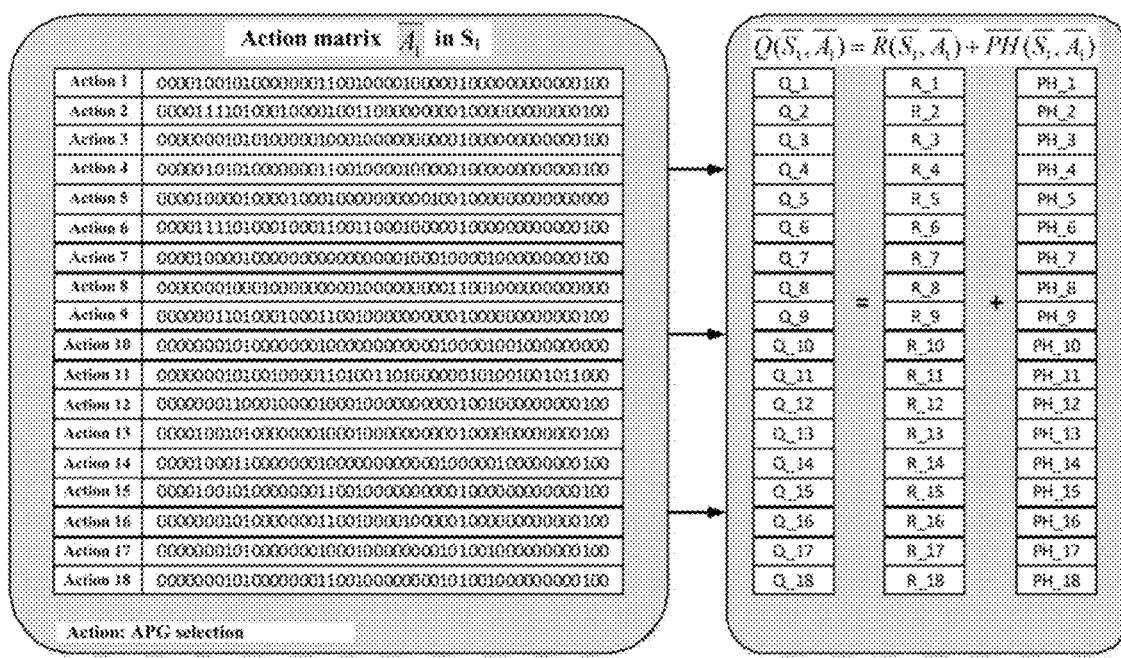
FIG. 10 is a diagram showing an example of an action matrix and a Q-value matrix.

The spectrum management matrix generates a Q-value matrix $\overline{Q(S_1, A_1)}$ corresponding to the matrix $\overline{A_1}$ by using the above mentioned Q-learning algorithm, as shown on the right side in FIG. 10. The Q-value matrix is calculated by using the above equations (3) to (5) and (7) to (8). In this simulation instance, the state $S_1$ is an initial state, and $\overline{PH(S_1, A_1)}$ is a null matrix.

Figure 11:
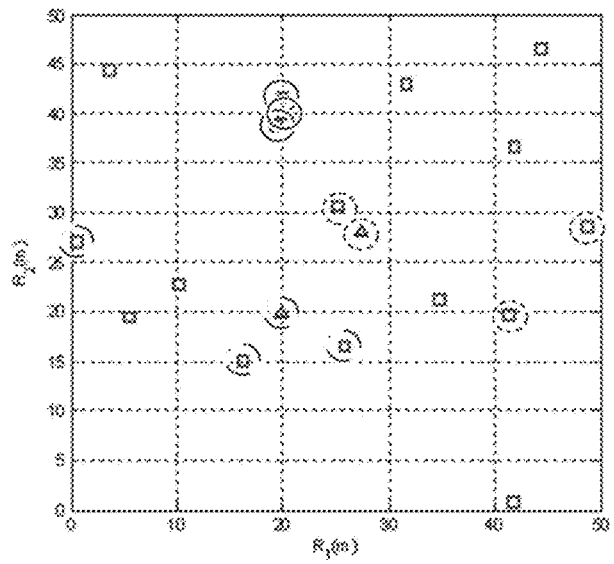
FIG. 11 is a schematic diagram showing a result after a determined action is performed.

The spectrum management device selects an action corresponding to a maximum value in the Q-value matrix, for example, an action 15, and notifies the AP to coordinate with the UE based on this action. FIG. 11 is a schematic diagram showing a result after the action 15 is performed. A UE and an AP that are circled with lines having the same line type have the coordination relationship.

Next, the state $S_1$ changes to the state $S_2$ due to movement of the UE. The UE uploads new position information, and an actual SINR and an actual utility value that are obtained by performing the action 15 in the state $S_1$ to the spectrum management device. The spectrum management device calculates an actual degree of meeting communication quality requirement obtained by performing the action 15 based on this information and by using the equation (9), and updates a value of R_15 in $R(\overline{S_1}, \overline{A_1})$ by using equation (10). In equation (10), γ is set to be zero.

Figure 12:
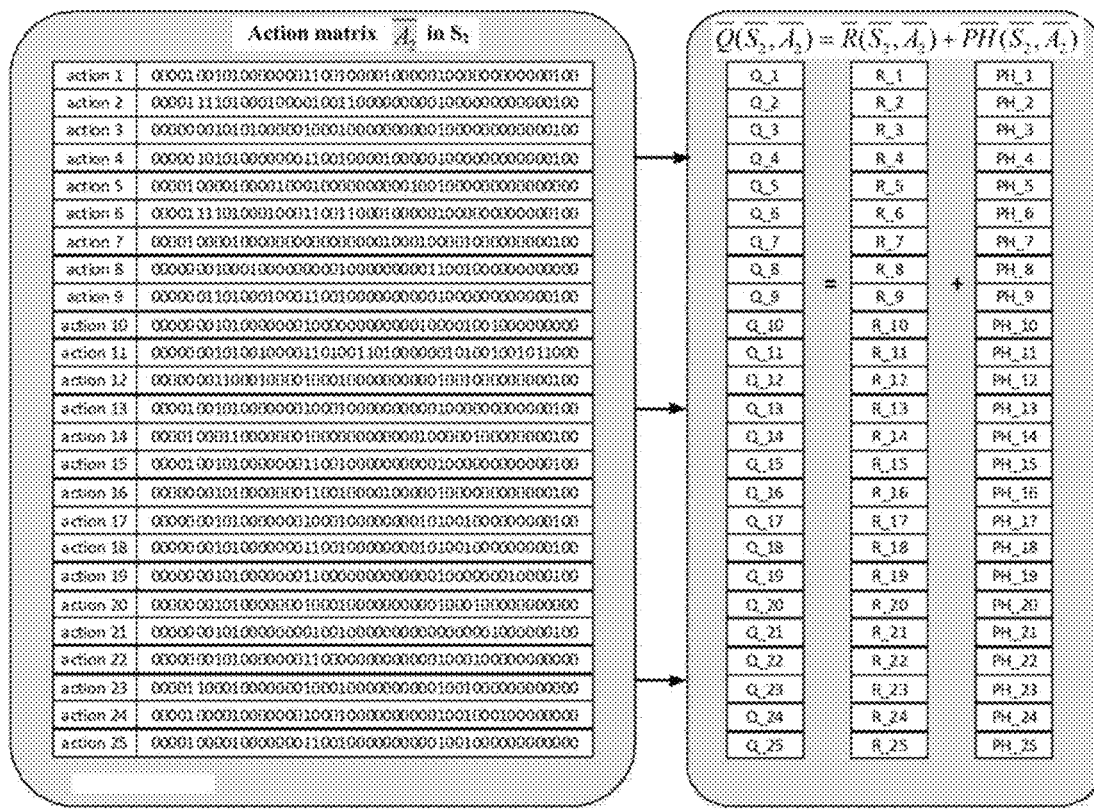
FIG. 12 is a diagram showing another example of the action matrix and the Q-value matrix.

The spectrum management device updates the action matrix in the state $S_1$ by using the genetic algorithm, to obtain an action matrix $\overline{A_2}$ in the state $S_2$, as shown on the left side in FIG. 12. Similarly, the spectrum management device generates a Q-value matrix $\overline{Q(S_2, A_2)}$ corresponding to $\overline{A_2}$ by using the above mentioned Q-learning algorithm, as shown on the right side in FIG. 12. The Q-value matrix is calculated by using the above equations (3) to (5) and (7) to (8).

Figure 13:
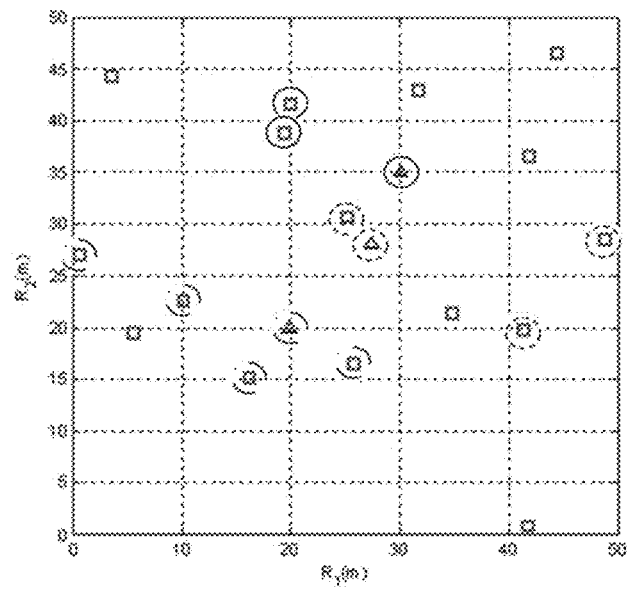
FIG. 13 is a schematic diagram showing a result after a determined action is performed.

The spectrum management device selects an action corresponding to a maximum value in the Q-value matrix, for example, an action 11, and notifies the AP to coordinate with the UE based on this action. FIG. 13 is a schematic diagram showing a result after the action 11 is performed. The UE and the AP that are circled with lines having the same line type have the coordination relationship.

When the state successively changes into the states $S_3$ and $S_4$, the spectrum management device performs operation similar to that in the state $S_2$, which is not repeated herein.

Figure 14:
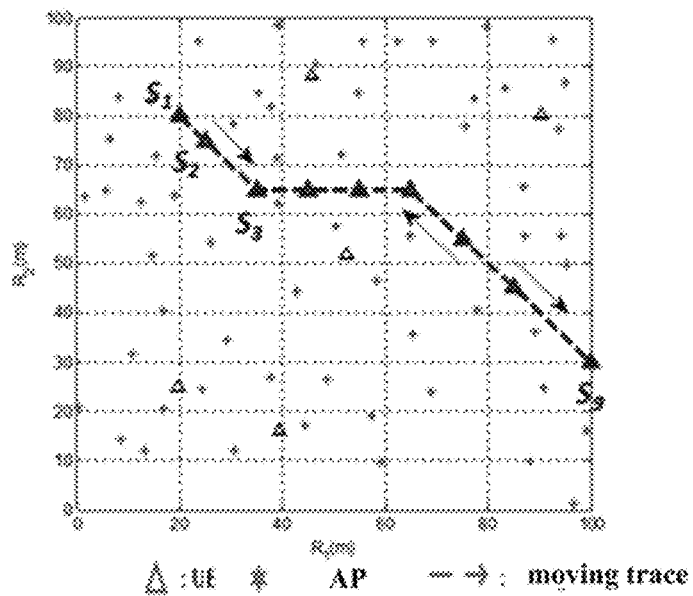
FIG. 14 is a schematic diagram showing a simulation scenario 1 of another simulation instance.
Figure 15:
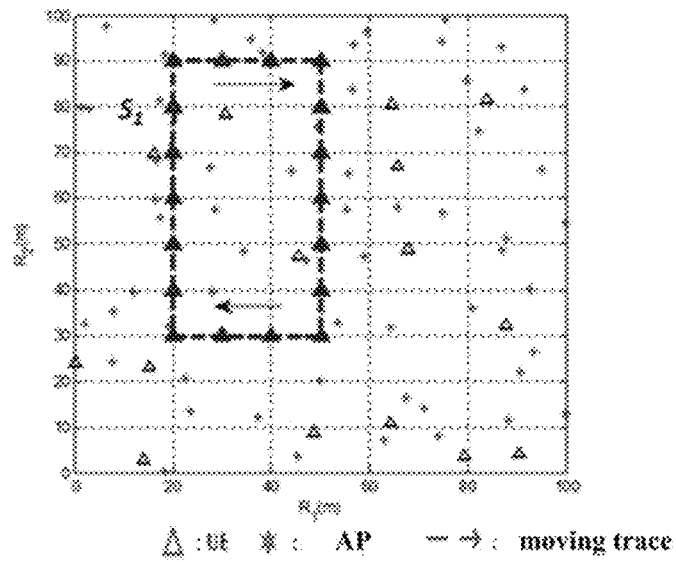
FIG. 15 is a schematic diagram showing a simulation scenario 2 of another simulation instance.

The second simulation instance is described below with reference to FIGS. 14 to 17. FIGS. 14 and 15 respectively show two simulation scenarios of the second simulation instance, where a dashed line with an arrow indicates a movement trace of a UE. In a simulation scenario 1 shown in FIG. 14, the UE reciprocates along the dashed line, thus the state changes from state $S_1$ to S9 and then to S1, that is $S_1 \rightarrow S_9 \rightarrow S_1$. In a simulation scenario 2 shown in FIG. 15, the UE moves cyclically along a rectangle formed by a dashed line. It is assumed that positions of UEs other than the above UE and APs remain unchanged in the two scenarios. An initial state is the state $S_1$ in a case of t=0, other states can be obtained based on positions to which the UE moves.

Parameters used in the simulation are listed as follows: an operation frequency of 28 GHz, a channel bandwidth of 10 MHz, 6 UEs, emitting power of 0 dBm, 60 APs, an SINR threshold for the UE of 7 dB, a noise figure of 5 dB at a receiver of the UE, 10 generations of population evolution in the genetic algorithm, a crossover ratio of 0.7, a mutation ratio of 0.1, 10 individuals, a beam width of π/4, and a Hamming distance threshold of 5 in the simulation scenario 1, and a Hamming distance threshold of 10 in the simulation scenario 2.

Figure 16:
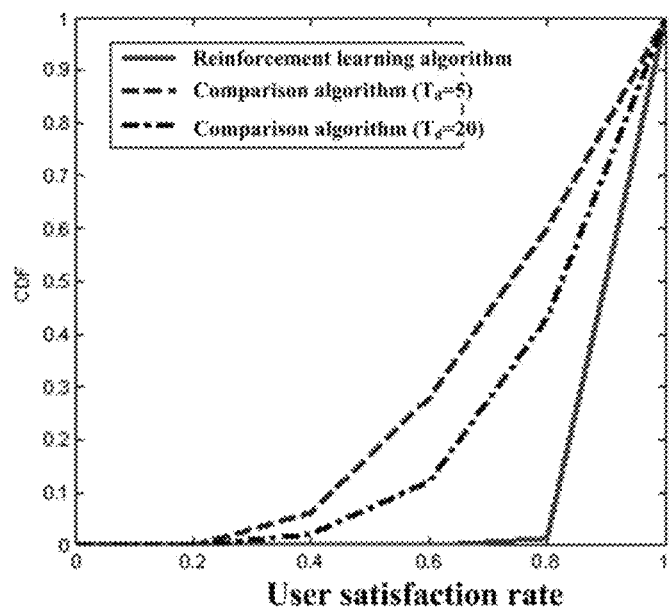
FIG. 16 is a comparison diagram of a cumulative distribution function (CDF) of a user satisfaction rate obtained based on the simulation scenario 1.

Besides the APG selection based on the reinforcement learning algorithm provided in the present disclosure, for comparison, the following simulation for the APG selection based a comparison algorithm is described with respect to the scenario 1: a new action is acquired by using the genetic algorithm, but the action is determined based on only a switch threshold, that is, a Hamming distance threshold $T_d$ for the APG reselection. FIG. 16 is a comparison diagram of a cumulative distribution function (CDF) of a user satisfaction rate obtained based on the simulation scenario 1, where a solid line denotes a CDF curve corresponding to the reinforcement learning algorithm, an upper dashed line denotes a CDF curve corresponding to the comparison algorithm in a case of a Hamming distance threshold being 5, and a lower dashed line denotes a CDF curve corresponding to the comparison algorithm in a case of a Hamming distance threshold being 20. It can be seen that, performance based on the reinforcement learning algorithm is superior to that based on the comparison algorithm.

Figure 17:
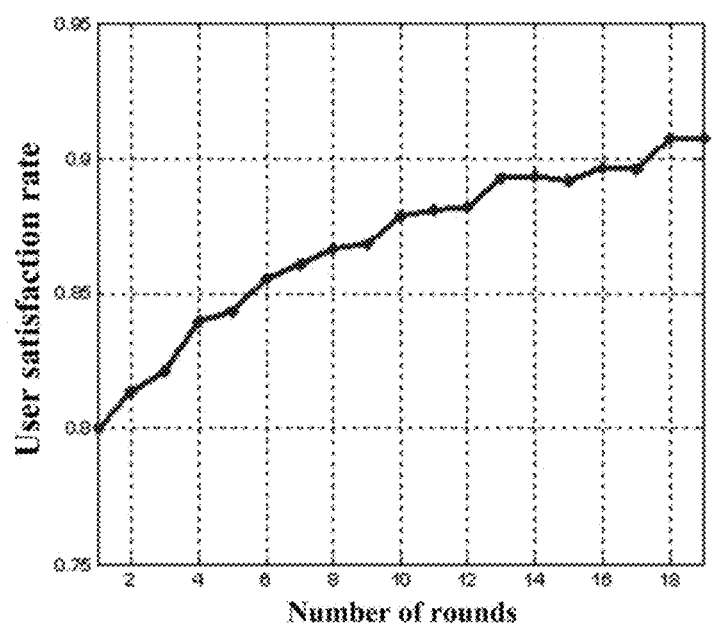
FIG. 17 is a graph showing ratios of meeting communication quality requirement of a user in a case that the user moves along a rectangular trace in the simulation scenario 2 with different numbers of rounds.

FIG. 17 shows ratios of meeting communication quality requirement such as QoS requirement of a user, in a case that the UE moves along a rectangle trace in the simulation scenario 2 with different numbers of rounds. It can be seen that, with the number of rounds increasing, a satisfaction rate of the user increases correspondingly, that is, the effect of the reinforcement learning algorithm is increasingly significant over time.

Fifth Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the method for wireless communications described below may be executed by a computer-executable program completely, although the hardware and/or firmware of the electronic apparatus for wireless communications can also be used in the methods.

Figure 18:
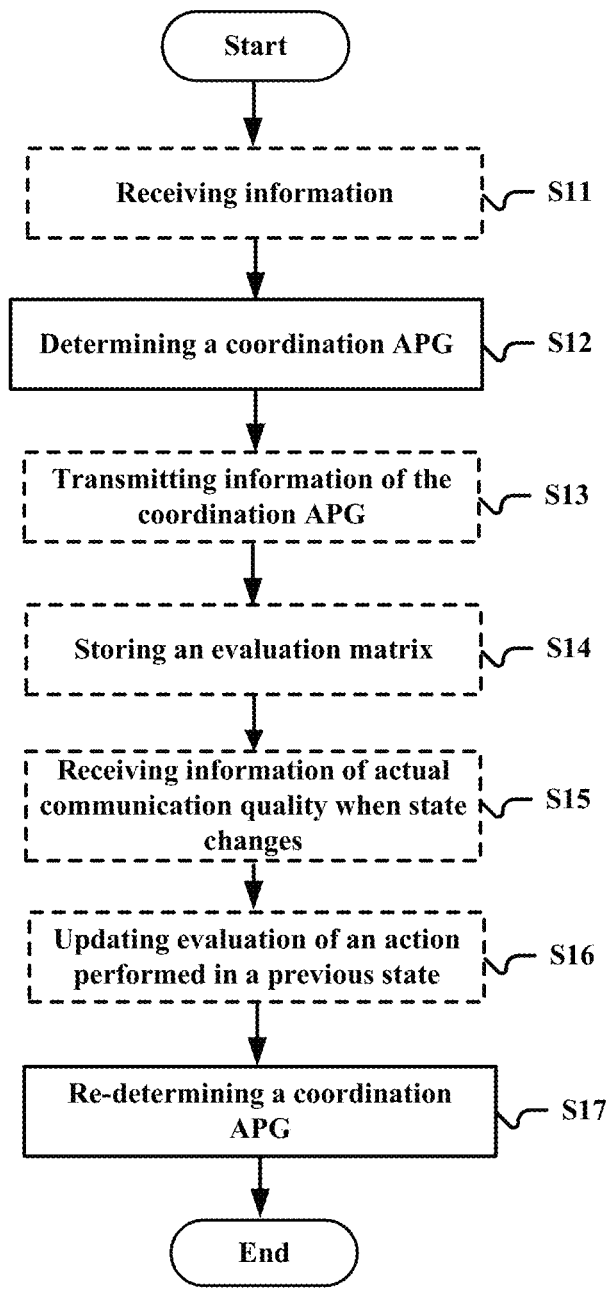
FIG. 18 is a flowchart of a method for wireless communications according to an embodiment of the present disclosure.

FIG. 18 is a flowchart of a method for wireless communications according to an embodiment of the present disclosure. As shown in FIG. 18, the method for wireless communications includes: determining a coordination APG for a user within a predetermined range, by taking a wireless network topology structure of a wireless network as a state (S12); and re-determining a coordination APG for the user in response to a change of the wireless network topology structure (S7). The wireless network topology structure may include a distribution of users and a distribution of access points. In an example, the coordination APG may be determined by using a reinforcement learning algorithm in step S12.

In step S12, a coordination relationship between the user and an access point is taken as an action in the reinforcement learning algorithm, and with respect to each action, an evaluation of the action is calculated based on a degree of meeting communication quality requirement of the user and a resulting network overhead when performing the action. For example, the coordination APG for the user in a current state is determined based on an action with the highest evaluation. The action with the highest evaluation is an action when being performed results in the highest degree of meeting the communication quality requirement of the user and the lowest network overhead, compared with other actions.

In an example, the degree of meeting the communication quality requirement of each user is calculated by using a signal to interference and noise ratio threshold for the user and an estimated signal to interference and noise ratio of the user. The degree of meeting the communication quality requirement of the user may include a utility value of all users and a cost value of not meeting the signal to interference and noise ratio of the user. The utility value of the users is calculated from a utility function. The utility function is a non-linear function of a ratio of the estimated signal to interference and noise ratio of the user to the signal to interference and noise ratio threshold for the user. The cost value depends on a difference between the signal to interference and noise ratio threshold for a user and the estimated signal to interference and noise ratio of the user.

In addition, with respect to each action, a difference between this action and an action determined in a previous state may be used as the network overhead produced by this action. The action may be represented by a binarization matrix of the coordination relationship. The network overhead may be represented by a Hamming distance between actions. The network overhead produced when performing the action may be taken into consideration only when the network overhead exceeds a predetermined overhead threshold.

In addition, as shown in dashed line blocks in FIG. 18, the above method may further include: receiving one or more of position information and communication quality requirement of the user, and one or more of position information, information of maximum emitting power and a predetermined network overhead threshold of the access point (S11), and transmitting information of the determined coordination access point group to the access point (S13). The information received in step S11 is used in calculation in step S12.

The above method may further include a step S14 of storing, with respect to each state, each action in this state in association with an evaluation calculated with respect to the action, as an evaluation matrix. In this way, in a case that state changes and there is an evaluation matrix for the changed state, an action to be performed in the changed state can be determined based on content of the evaluation matrix.

In addition, the above method may further include a step S15 of receiving information of actual communication quality of the user in a case that the state changes. The above method further includes a step S16 of updating stored evaluation of the action performed in the previous state using information of the actual communication quality of the user when performing the determined action in the previous state, that is, updating the content of the evaluation matrix.

For example, a portion of the evaluation of the action performed in the previous state which is related to the degree of meeting the communication quality requirement of the user may be replaced with a following calculated value: a weighted sum of the actual degree of meeting the communication quality requirement of the user in the previous state and the estimated highest degree of meeting the communication quality requirement of the user in the current state.

In addition, although not shown in FIG. 18, the above method may further include: acquiring, in each state, the action by grouping the access points taking the user as a center and selecting the coordination access point group for the user within a group of the user. For example, the grouping may be performed based on a Euclidean distance between the user and the access point. In this case, the coordination access point group for the user is randomly selected within the group of the user, and the coordination relationship between the user and the access point which meets a predetermined condition is taken as the action. The predetermined condition, for example, may include one or more of: the communication quality for each user meets the communication quality requirement of the user; and the network overhead produced when using this coordination relationship relative to an action determined in the previous state does not exceed a predetermined overhead threshold.

In addition, with respect to each state, a new action may be estimated based on a preliminarily acquired action when acquiring actions. For example, the new action may be estimated by using a genetic algorithm. An action estimated by using the genetic algorithm may be taken as the new action only when the action meets the above predetermined condition.

It should be noted that, details of the above method are described in the first to fourth embodiments, and are not repeated herein.

The technology of the present disclosure can be applied to various products. For example, each of the electronic apparatus 100 to 400 may be implemented as various servers, such as a tower server, a rack-mounted server, and a blade server. Each of the electronic apparatus 100 to 400 may be a control module (such as an integrated circuitry module including a single die, and a card or blade inserted in a groove of a blade server) mounted on a server.

Application Example Regarding a Server

Figure 19:
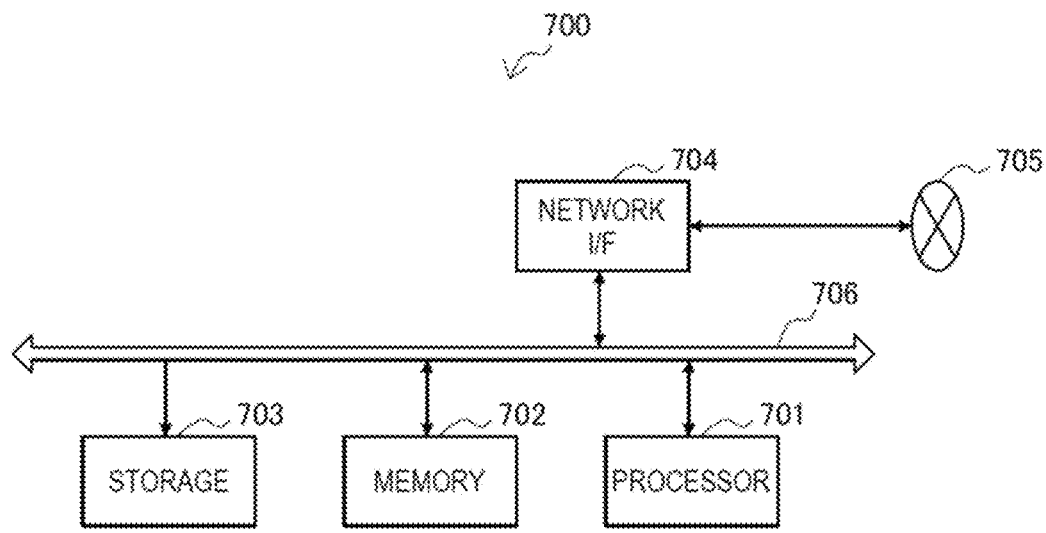
FIG. 19 is a block diagram showing an example of a schematic configuration of a server 700 to which the technology of the present disclosure may be applied.

FIG. 19 is a block diagram showing an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 shown in FIG. 19, the determining unit 101, the updating unit 102, the grouping unit 201, the estimating unit 301 and the like that are respectively described with reference to FIGS. 2, 5, 6 may be implemented by the processor 701. The storage unit 103 described with reference to FIG. 4 may be implemented by, for example, the memory 702 or the storage 703. The transceiving unit 401 described with reference to FIG. 7 may be implemented by, for example, the network interface 704. A part of functions of the storage unit 103 and the transceiving unit 401 may also be implemented by the processor 701. For example, the processor 701 may perform selecting and updating of the coordination APG by performing functions of the determining unit 101, the updating unit 102 and the like.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2000 shown in FIG. 20) from a storage medium or network, wherein the computer is capable of implementing various functions when installed with various programs.

Figure 20:
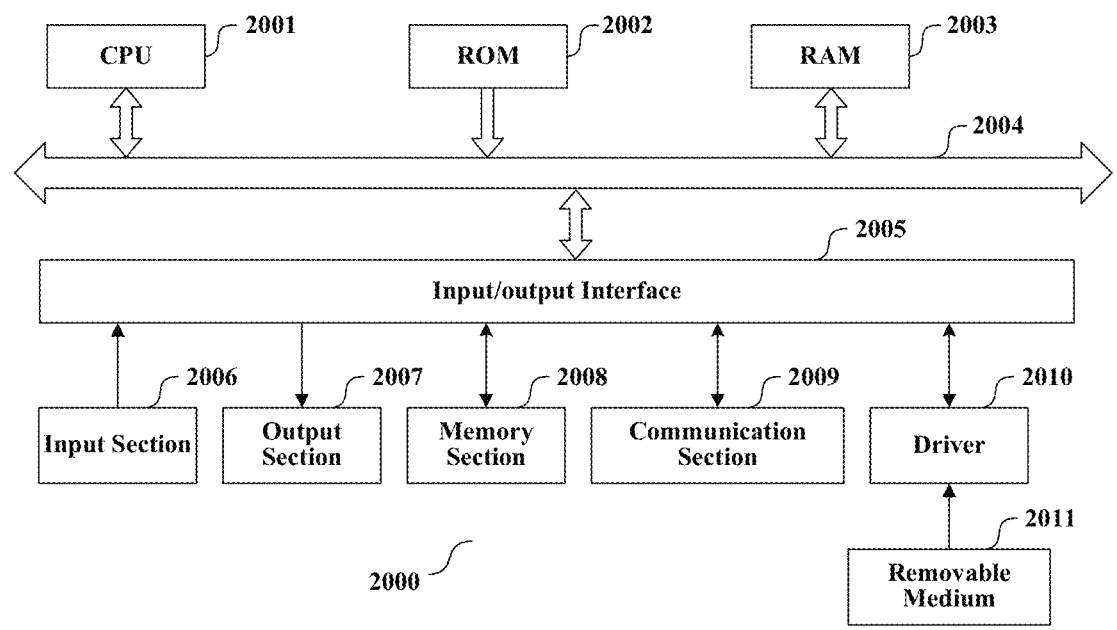
FIG. 20 is a block diagram of an exemplary block diagram illustrating the structure of a general purpose personal computer capable of realizing the method and/or device and/or system according to the embodiments of the present disclosure.

In FIG. 20, a central processing unit (CPU) 2001 executes various processing according to a program stored in a read-only memory (ROM) 2002 or a program loaded to a random access memory (RAM) 2003 from a memory section 2008. The data needed for the various processing of the CPU 2001 may be stored in the RAM 2003 as needed. The CPU 2001, the ROM 2002 and the RAM 2003 are linked with each other via a bus 2004. An input/output interface 2005 is also linked to the bus 2004.

The following components are linked to the input/output interface 2005: an input section 2006 (including keyboard, mouse and the like), an output section 2007 (including displays such as a cathode ray tube (CRT), a liquid crystal display (LCD), a loudspeaker and the like), a memory section 2008 (including hard disc and the like), and a communication section 2009 (including a network interface card such as a LAN card, modem and the like). The communication section 2009 performs communication processing via a network such as the Internet. A driver 2010 may also be linked to the input/output interface 2005, if needed. If needed, a removable medium 2011, for example, a magnetic disc, an optical disc, a magnetic optical disc, a semiconductor memory and the like, may be installed in the driver 2010, so that the computer program read therefrom is installed in the memory section 2008 as appropriate.

In the case where the foregoing series of processing is achieved through software, programs forming the software are installed from a network such as the Internet or a memory medium such as the removable medium 2011.

It should be appreciated by those skilled in the art that the memory medium is not limited to the removable medium 2011 shown in FIG. 20, which has program stored therein and is distributed separately from the apparatus so as to provide the programs to users. The removable medium 2011 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2002 and the memory section 2008 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
    processing circuitry, configured to:
    determine a coordination access point group for a user of a distribution of users within a predetermined range, by taking a wireless network topology structure of a wireless network as a state; and
    re-determine the coordination access point group for the user in response to a change of the wireless network topology structure,
    wherein the wireless network topology structure comprises the distribution of users and a distribution of access points,
    wherein the processing circuitry is configured, for plural coordination relationships between the user and each access point of the distribution of access points, to take each coordination relationship as a corresponding action, and with respect to each action, determine, based on a degree of meeting communication quality requirement of the user and a resulting network overhead when performing the corresponding action, an evaluation of the corresponding action, wherein the processing circuitry is configured to determine the coordination access point group for the user in a current state based on the corresponding action with a highest evaluation,
    wherein each of the plural coordination relationships correspond to a state of a plurality of states, the electronic apparatus further comprising a storage, configured to store, with respect to each state, each action in this state in association with an evaluation determine with respect to the action as a corresponding evaluation matrix,
    wherein the processing circuitry is configured to update, when any state of the plurality of states changes, an evaluation for the action performed in a corresponding previous state which is stored in the storage using information of actual communication quality of the user when performing the action in the previous state.

2. The electronic apparatus according to claim 1, the action with the highest evaluation is an action, when being performed, results in a highest degree of meeting the communication quality requirement of the user and the lowest network overhead, compared with other actions.

3. The electronic apparatus according to claim 1, wherein the processing circuitry is configured to determine, using a signal to interference and noise ratio threshold for each user of the distribution of users and an estimated signal to interference and noise ratio of each user, the degree of meeting the communication quality requirement of the user.

4. The electronic apparatus according to claim 3,
    wherein, the degree of meeting the communication quality requirement of the user comprises a utility value of all users of the distribution of users and a cost value of not meeting the signal to interference and noise ratio of all users of the distribution of users,
    wherein the utility value of each user is determined from a corresponding utility function, each utility function being a non-linear function of a ratio of a corresponding user's estimated signal to interference and noise ratio to a corresponding user's signal to interference and noise ratio threshold, and each cost value depending on a difference between the corresponding user's signal to interference and noise ratio threshold and the corresponding user's estimated signal to interference and noise ratio.

5. The electronic apparatus according to claim 1, wherein the processing circuitry is configured to use, with respect to each of the corresponding actions, a difference between this action and an action determined in a previous state as a network overhead produced by this action, the network overhead being represented by a Hamming distance between this action and the action determined in the previous state.

6. The electronic apparatus according to claim 5, wherein the network overhead produced when performing the action is taken into consideration when the network overhead exceeds a predetermined overhead threshold.

7. The electronic apparatus according to claim 1, wherein the processing circuitry is further configured to determine, when any state of the plurality of states changes and in a case that there is an evaluation matrix for the changed state, an action to be performed in the changed state based on content of an evaluation matrix of the changed state.

8. The electronic apparatus according to claim 1, wherein, based on the evaluation for the action, the processing circuitry is configured to replace a portion of the evaluation of the action with a determined value that comprises: a weighted sum of an actual degree of meeting the communication quality requirement of the user in the previous state and an estimated highest degree of meeting the communication quality requirement of the user in the current state.

9. The electronic apparatus according to claim 1, wherein the processing circuitry is configured to: in any state, acquire a corresponding action by grouping the distribution of access points taking the user as a center and selecting a corresponding coordination access point group for the user.

10. The electronic apparatus according to claim 9, wherein the processing circuitry is configured to perform the grouping of the distribution of access points according to a Euclidean distance between the user and each access point.

11. The electronic apparatus according to claim 9, wherein the processing circuitry is configured to randomly select the coordination access point group for the user and take a coordination relationship between the user and any access point which meets a predetermined condition as the action.

12. The electronic apparatus according to claim 11, wherein the predetermined condition comprises one or more of: the communication quality for each user meets the communication quality requirement of the user; the network overhead produced when using this coordination relationship relative to an action determined in the previous state does not exceed a predetermined overhead threshold.

13. The electronic apparatus according to claim 1, wherein each of the plural coordination relationships correspond to a state of a plurality of states, and wherein the processing circuitry is further configured to estimate, with respect to each state, a new action based on a preliminarily acquired action.

14. The electronic apparatus according to claim 13, wherein the processing circuitry is configured to estimate the new action using a genetic algorithm, and take an action estimated by the genetic algorithm as the new action only when the new action satisfies a predetermined condition.

15. The electronic apparatus according to claim 1, further comprising:
   transceiving circuitry configured to receive:
      one or more of position information and a communication quality requirement of the user, and
      one or more of position information, information of maximum emitting power and a predetermined network overhead threshold of the access point, and
   the transceiving circuitry further configured to transmit information of the determined coordination access point group to the access point.

16. The electronic apparatus according to claim 15, wherein the transceiving circuitry is further configured to receive information of the actual communication quality of the user.

17. A method for wireless communications by a device comprising processing circuitry, the method comprising:
   determining a coordination access point group for a user of a distribution of users within a predetermined range, by taking a wireless network topology structure of a wireless network as a state; and
   re-determining the coordination access point group for the user in response to a change of the wireless network topology structure,
   wherein the wireless network topology structure comprises the distribution of the users and a distribution of the access points;
   for plural coordination relationships between the user and each access point of the distribution of access points, taking each coordination relationship as a corresponding action, and with respect to each action, determining, based on a degree of meeting communication quality requirement of the user and a resulting network overhead when performing the corresponding action, an evaluation of the corresponding action;
   determining the coordination access point group for the user in a current state based on the corresponding action with a highest evaluation,
   wherein each of the plural coordination relationships correspond to a state of a plurality of states;
   storing, with respect to each state, each action in this state in association with an evaluation determine with respect to the action as a corresponding evaluation matrix;
   updating, when any state of the plurality of states changes, an evaluation for the action performed in a stored corresponding previous state using information of actual communication quality of the user when performing the action in the previous state.

* * * * *